(12) United States Patent
Ortiz Niembro et al.

(10) Patent No.: US 8,394,975 B2
(45) Date of Patent: Mar. 12, 2013

(54) AMORPHOUS ADSORBENT, METHOD OF OBTAINING THE SAME AND ITS USE IN THE BLEACHING OF FATS AND/OR OILS

(75) Inventors: José Antonio Ortiz Niembro, Puebla (MX); Germán Solis Santamaria, Puebla (MX); Erik Thomassiny Villaurrutia, Puebla (MX); Friedrich Ruf, Ast (DE)

(73) Assignee: Sud-Chemie AG, Munich (DE)

( * ) Notice: Subject to any disclaimer, the term of this patent is extended or adjusted under 35 U.S.C. 154(b) by 654 days.

(21) Appl. No.: 12/513,918

(22) PCT Filed: Nov. 7, 2007

(86) PCT No.: PCT/EP2007/009655
§ 371 (c)(1),
(2), (4) Date: Dec. 29, 2009

(87) PCT Pub. No.: WO2008/055675
PCT Pub. Date: May 15, 2008

(65) Prior Publication Data
US 2010/0094035 A1 Apr. 15, 2010

(30) Foreign Application Priority Data
Nov. 7, 2006 (EP) .................................... 06023142

(51) Int. Cl.
*C11B 3/10* (2006.01)
*B01J 21/16* (2006.01)
(52) U.S. Cl. ............... 554/193; 502/80; 502/81; 502/83
(58) Field of Classification Search ................... 554/193; 502/80, 81, 83
See application file for complete search history.

(56) References Cited

U.S. PATENT DOCUMENTS

| | | | |
|---|---|---|---|
| 5,008,226 A | 4/1991 | Taylor et al. | |
| 5,053,169 A | 10/1991 | Price | |
| 5,869,415 A | 2/1999 | Ortiz et al. | |
| 7,579,299 B2 | 8/2009 | Flessner et al. | |
| 2003/0150811 A1* | 8/2003 | Walter et al. .................. | 210/656 |
| 2005/0188607 A1 | 9/2005 | Lastella | |
| 2006/0128564 A1 | 6/2006 | Flessner | |
| 2006/0269464 A1 | 11/2006 | Turkay et al. | |
| 2007/0175091 A1 | 8/2007 | Danzer et al. | |
| 2007/0175092 A1 | 8/2007 | Ames | |
| 2008/0223756 A1 | 9/2008 | Schurz | |
| 2009/0044921 A1 | 2/2009 | Sohling et al. | |

FOREIGN PATENT DOCUMENTS

| | | |
|---|---|---|
| DE | 103 56 894 A1 * | 7/2005 |
| DE | 10 2004 060 587 A1 | 7/2006 |
| WO | WO 99/02256 A1 | 1/1999 |
| WO | WO 99/22860 | 5/1999 |
| WO | WO 99/32577 | 7/1999 |
| WO | WO 01/12581 A1 | 2/2001 |
| WO | WO/2004/105936 | 12/2004 |
| WO | WO 2004/105936 A1 | 12/2004 |
| WO | WO 2004105936 A1 * | 12/2004 |
| WO | WO 2005/037969 A2 | 4/2005 |
| WO | WO/2006/071183 | 7/2006 |
| WO | WO 2006/071183 A1 | 7/2006 |
| WO | WO 2006071183 A1 * | 7/2006 |
| WO | WO 2006/131136 A1 | 12/2006 |
| WO | WO 2007/012190 A1 | 2/2007 |
| WO | WO 2007/076163 A2 | 7/2007 |

OTHER PUBLICATIONS

Li Y et al, Microporous and Meso Porous Materials, vol. 60, No. 1-3, Jun. 19, 2003, pp. 51-56.*
Carrado K A et al., Microporous and Meso Porous Materials, vol. 20, No. 1-3, Feb. 1998, pp. 17-26.*
Robert J. O'Brien, et al., "Activity, selectivity and attrition characteristics of supported iron Fischer-Tropsch catalysts," *Applied Catalysis A: General*, vol. 196, 2000, pp. 173-178.
Kathleen A. Carrado, et al., "Materials derived from synthetic organo-clay complexes as novel hydrodesulfurization catalyst supports," *Microporous and Mesoporous Materials*, vol. 20, 1998, pp. 17-26.
Yongsheng Li, et al., "One-step synthesis of hydrothermally stable cubic mesoporous aluminosilicates with a novel particle structure," *Microporous and Mesoporous Materials*, vol. 60, 2003, pp. 51-56.
Mittelbach, Martin et al., "Biodiesel The comprehensive Handbook," Graz, 2004, ISBN 3-200-00249-2, contents and pp. 48-87.
Douglas K. McCarty, "Quantitive Mineral Analysis of Clay-bearing Mixtures: The "Reynolds Cup" Contest," *IUCr CPD Newsletter*, No. 27, 2002, pp. 12-16.
Elliott P. Barrett et al., "The Determination of Pore Volume and Area Distributions in Porous Substances. I. Computations from Nitrogen Isotherms," *Journal of American Chemical Society*, vol. 73, 1951, pp. 373-380.
K. S. W. Sing et al., "Reporting Physisorption Data for Gas/Solid Systems," *Pure & Appl Chem.*, vol. 57, No. 4, 1985, pp. 603-619.
European Search Report of EP 06 02 3142, dated May 8, 2007.
International Search Report of PCT/EP2007/009655, dated Jan. 3, 2008.
Carrado K. A. et al.; Materials Derived From Synthetic Organo-Clay Complexes as Novel Hydrodesulfurization Catalyst Supports; Microporous and Mesoporous Materials, , vol. 20, No. 1-3; Feb. 1998; pp. 17-26; Elsevier Science Publishing, New York, U.S.A.

(Continued)

*Primary Examiner* — Deborah D Carr
(74) *Attorney, Agent, or Firm* — RatnerPrestia

(57) ABSTRACT

The invention relates to a method for producing an adsorbent, in particular a bleaching earth, wherein a clay material having: a surface area of 180 to 300 m2/g; a total pore volume of 0.5 to 0.7 ml/l; wherein at least 60% of the total pore volume are provided by pores having a pore diameter of at least 140 A, at least 40% of the total pore volume is provided by pores having a pore diameter of less than 250 A and at least 15% of the total pore volume are provided by pores having a pore diameter of 140 to 250 A; and said clay material having an amorphous structure according to XRD data; is activated by an activation procedure. Further, the invention relates to an adsorbent as obtained by the method and a method for purification of oils, fats and biofuels.

20 Claims, No Drawings

OTHER PUBLICATIONS

O'Brien R.J. et al; Activity Selectivity and Attrition Characteristics of Supported Iron Fischer-Tropsch Catalysts;Applied Catalysis A: General; vol. 196, No. 2; Apr. 10, 2000; pp. 173-178; Elsevier Science, Amsterdam, Netherlands.

Li, Y. et al.; One-Step Synthesis of Hydrothermally Stable Cubic Mesoporous Aluminosilicates With a Novel Particle Structure; Microporous and Mesoporous Materials; vol. 60; No. 1-3; Jun. 19, 2003; pp. 51-56; Elsevier Science Publishing, New York, U.S.A.

International Search Report, dated Dec. 20, 12007.

European Search Report, dated May 8, 2007.

* cited by examiner

AMORPHOUS ADSORBENT, METHOD OF OBTAINING THE SAME AND ITS USE IN THE BLEACHING OF FATS AND/OR OILS

This is a U.S. National Phase application of application number PCT/EP2007/009655, filed Nov. 7, 2007 (which is incorporated herein by reference in its entirety), which claims priority benefit of EP 06023142.0 (filed Nov. 7, 2006).

The invention relates to a method for producing an adsorbent, in particular a bleaching earth, an adsorbent obtained by said method, and a method for bleaching fats and/or oils.

In the industrial production of edible and inedible oils and fats so-called bleaching earths are used to remove coloured pigments as well as colourless pigments from the crude oils and fats. By this adsorptive purification process taste, colour and also stability of the oils and fats may be substantially improved. For purification different types of bleaching earths may be used. A first group is formed by so-called high performance bleaching earths (HPBE). HPBE are produced by leaching bentonite clays with strong mineral acids at a temperature of about the boiling temperature of the acid. To obtain high performance bleaching earths typically about 60 to 90 wt.-% of concentrated acid based on the dry starting clay material are used. During leaching aluminium ions together with other metal ions are removed from the clay structure and dissolved in the acid. After leaching the salts formed during activation and the acid must be separated from the product clay by filtration and residual acid must be removed from the clay by sufficient washing with water. If high levels of residual acid are left in the clay, the quality of the bleached oil is impaired. High residual acid levels generate undesirable free fatty acids from the fatty acid triglycerides in the oil. During leaching of the clay with acid a waste liquid is produced containing salts of the ions leached from the clay as well as residual acid. Such waste liquid must be neutralized for deposition or may be used in a further process, e.g. the treatment of sewage water.

WO 2004/105936 discloses a method for reprocessing an acid suspension as obtained in the manufacturing of HPBE. The suspension is mixed with an alkali silicate solution such that the pH of the mixture is adjusted to more than 4. The formed precipitate is separated from the liquid phase, optionally washed, dried and ground. The precipitate comprises about 79.5 wt.-% $SiO_2$ and about 6.1 wt.-% $Al_2O_3$. It has a pore volume of about 0.685 ml/g and a surface area of about 370 $m^2/g$.

A further group of bleaching earths are naturally-occurring clays that basically only need drying for activation. Such naturally active bleaching earths (NABE) are used since several hundreds of years. They may be produced at relatively low cost but have the disadvantage that they have a comparatively low bleaching activity. Therefore, in comparison with HPBE larger amounts of bleaching earth have to be used and, therefore, higher losses of oil remaining in the used bleaching earth have to be tolerated. Naturally occurring clays having bleaching activity are rich in minerals attapulgite or sepiolite, which are also classified as palygorskite clays.

A third group of bleaching earths are the so-called surface modified bleaching earths (SMBE) which are obtained by depositing a small amount of acid onto a naturally active bleaching earth. The activation of the clay may be performed by spraying a solution of an acid onto the clay followed by drying, or by grinding the clay together with a solid acid, e.g. citric acid. By deposition of the acid onto the clay an "in-situ activation" is achieved. No washing of the clay with water is required after activation and, therefore, SMBE may be produced at reasonable costs. The bleaching activity of SMBE is higher than of NABE but usually does not reach the activity of HPBE. SMBE are produced from clays containing attapulgite or hormite. These clays have a quite high specific surface area of about 100 to 180 $m^2/g$ and a total pore volume of about 0.2 to 0.35 ml/g. During activation with acid, however, salts formed on the surface of the clay as well as residual acid remain on the clay product and may be deposited in the pores of the clay such that pore volume and surface area are reduced in comparison with the starting clay.

U.S. Pat. No. 5,008,226 discloses a process for making acid-activated bleaching earth from certain naturally occurring mixtures of calcium bentonite and attapulgite clay. The process involves treating such clay with low levels of activating acid which are mixed with the dried and ground clay, or spray dried from slurries containing the clay-acid mixture. The clay has a pore volume of about 0.25 to 0.50 ml/g and a specific surface area of 100 to 150 $m^2/g$. The mineral used as starting clay comprises 71 to 75 wt.-% $SiO_2$ and 11 to 16 wt.-% $Al_2O_3$. The attapulgite/bentonite mineral is treated at a temperature of about 25 to 100° C. with about 1 to 10 wt.-% acid. The acid activated product may be used immediately after drying without the necessity of an intermediate washing step.

U.S. Pat. No. 5,869,415 discloses a process for activation of layered silicates having an ion exchange capacity (IEC) of at least 25 meq/100 g by treating them with an acid. The layered silicate is activated with about 1 to 10 wt.-% (based on the dry layered silicate) of an acid at a temperature of not more than 80° C. The activated layered silicate is calcined at temperatures of about 200 to 400° C. and comminuted, if desired. The layered silicates have a specific surface area of about 130 to 170 $m^2/g$, a pore volume of about 0.27 to 0.35 ml/g and an ion exchange capacity of 38 to 68 meq/100 g.

WO 99/02256 discloses a method for the manufacture of a bleaching clay wherein a clay having a moisture level of not more than about 45 wt.-% is treated with an aqueous acid solution to provide an acidified clay having an acid content in the range of about 1 to 5 wt.-%, based on the dry weight of the clay. The clay is ground to a mean particle size in the range of about 25 to 45 μm and then dried to a moisture level of not more than about 13 wt.-%. As a starting material is used a palygorskite-smectite clay.

Hitherto have been used layered silicates, in particular smectites and palygorskites, as a starting material for the manufacturing of acid activated bleaching earths. These clays have a specific surface area of about 100 to 180 $m^2/g$, a pore volume of 0.25 to 0.50 ml/g and an ion exchange capacity of about 40 to 70 meq/100 g. Recently have been described clay materials suitable for bleaching of oils and fats that have an amorphous structure and therefore may not be designated as smectite or palygorskite clay. Such materials have a high surface area and a high pore volume and are rich in $SiO_2$. Those clay-like materials may be found in nature. They are completely different in their structure when compared to the clays hitherto used as bleaching earth or for the manufacturing of acid activated bleaching earth.

WO 2006/131136 discloses an adsorbent containing a clay material having a specific surface area of more than 200 $m^2/g$, an ion exchange capacity of more than 40 meq/100 g; and a pore volume determined by nitrogen porosimetry of more than 0.5 ml/g, wherein at least 40% of the pore volume is provided by pores, having a pore diameter of at least 14 nm and at most 25% of the pore volume is provided by pores having a diameter of less than 7.5 nm. The clay material is amorphous according to its XRD-data and comprises a large amount of $SiO_2$ such that it seems the clay material comprises a network formed of amorphous $SiO_2$ in which small platelets of clay are arranged. The bleaching earth is particularly suitable for the bleaching of oil containing low amounts of phospholipids, e.g. palm oil.

This new class of bleaching earths provides the advantage of having a high bleaching activity which may be further enhanced by surface treatment with acid, e.g. by spraying an aqueous solution of an acid onto the clay material. Because of its high bleaching activity only small amounts of bleaching earth have to be added to the oil to be purified to obtain the desired purification degree. Besides high bleaching efficiency a bleaching earth suitable for large scale application should also provide high filtration efficiency and high oil retention efficiency. A high filtration efficiency is important to allow filtration of the oil after bleaching within a reasonable time period. A high oil retention efficiency is important to minimize losses of oil remaining in the used bleaching earth. To obtain an optimum bleaching earth all three prerequisites must be fulfilled. Bleaching activity efficiency, filtration efficiency and oil retention efficiency may be combined to a total efficiency to allow evaluation of a bleaching earth. A bleaching earth suitable for bleaching oils on a large scale basis therefore should provide a high total efficiency.

It therefore is an object of the invention to provide a method for obtaining a bleaching earth that has a high total efficiency.

This object is solved by a method according to claim 1. Preferred embodiments are defined in the depending claims.

Surprisingly, it has been found that by carefully selecting the starting material a bleaching earth may be produced, that has a high bleaching activity, a high filtration efficiency and a high oil retention efficiency and therefore a high total efficiency. The bleaching earth according to the invention may be used in low amounts to achieve the desired purification of a crude oil within short time and with low losses.

To allow an estimation of total efficiency, the bleaching activity efficiency, the filtration efficiency and the oil retention efficiency must be weighted. Bleaching activity efficiency is most important for the use of a bleaching earth to allow rapid bleaching with small amounts of bleaching earth. The bleaching activity efficiency may be obtained by measuring the red colour intensity after bleaching and deodorization of an oil. The detailed method for obtaining the bleaching activity efficiency is described in the experimental part of the description. The bleaching activity efficiency amounts to 60% of the total efficiency.

The filtration rate efficiency is determined by measuring the time necessary for a given amount of a given oil to pass a defined filter package. A filtration rate of 45 seconds is defined as being a filtration rate efficiency of 100%. The filtration rate efficiency amounts for 20% of the total efficiency.

The oil retention efficiency is determined by measuring the amount of oil retained in the bleaching earth after use. An oil retention of 35 wt.-% is considered 100% efficiency. The oil retention efficiency amounts for 20% of the total efficiency. Methods for determining the filtration rate efficiency and the oil retention efficiency are presented in the experimental part of the application.

The adsorbent obtained with the method according to the invention has a large amount of micropores having a diameter of less than 250 Å, which the inventors believe to be efficient in the adsorption of coloured impurities, e.g. chlorophyll. The adsorbent further has a low amount of pores having a diameter of >800 Å and less than 15% of the total pore volume is formed by pores having a diameter of >800 Å. Such larger pores adsorb oil and, as the adsorbent has a low amount of large pores, it shows a low oil retention. The inventors further assume that a further effect caused by the low amount of larger pores is the better filtration efficiency. It is believed that the large pores are "blocked" by crude oil passing a filter formed by the adsorbent and therefore effect a decrease in filtration rate. Due to the low amount of larger pores, the adsorbent obtained by the method according to the invention therefore has a better filtration rate. In summary, by carefully selecting the ratio of pore volumes formed of pores having a defined diameter, an adsorbent having a high total efficiency may be obtained.

According to a first aspect of the invention therefore is provided a method for producing an adsorbent, in particular a bleaching earth, wherein a clay material having:
a surface area of 180 to 300 $m^2/g$;
a total pore volume of 0.5 to 0.7 ml/l;
wherein at least 60% of the total pore volume is provided by pores having a pore diameter of at least 140 Å, at least 40% of the total pore volume is provided by pores having a pore diameter of less than 250 Å, at least 15% of the total pore volume is provided by pores having a pore diameter of 140 to 250 Å and less than 20% of the total pore volume is formed by pores having a diameter of >800 Å; and
said clay material having an amorphous structure according to XRD data;
is activated by an activation procedure.

The clay material used as a starting material in the method according to the invention may be a synthetic material. Preferably, however, is used a clay material provided from a natural source. Opposite to the minerals used hitherto for the manufacturing of bleaching earth, which are layered silicates, an amorphous material is used that does not show sharp reflexes in an X-ray diffraction pattern. The clay material must have a high specific surface area and a large total pore volume. The inventors believe that the distribution of the pore volume within pores of different size is essential for the high bleaching activity. In particular if activated with acid it is believed, that a small amount of acid is retained in some of the pores of a distinct size and, therefore, enhance bleaching activity without causing a cleavage of fatty acid glycerides.

The clay material preferably comprises a high amount of $SiO_2$ of more than 60 wt.-%, particularly preferred more than 65 wt.-% and most preferred more than 70 wt.-%. According to an embodiment, the clay material contains less than 75 wt.-% $SiO_2$. It therefore is believed that the clay material comprises a network matrix made of amorphous $SiO_2$ into which small clay particles are inserted which therefore may provide a high bleaching activity.

As described above, the inventors believe, that the clay material comprises a matrix-like network of $SiO_2$, into which small platelets of clay are introduced. The clay material therefore preferably has a low aluminium content, which forms a component of the clay particles. Preferably, the clay material contains aluminium, calculated as $Al_2O_3$, in an amount of less than 15 wt.-%, more preferred less than 12 wt.-%, particularly preferred less than 11 wt.-% and most preferred less than 10 wt.-%. The clay material preferably contains aluminium, calculated as $Al_2O_3$, in an amount of more than 2 wt.-%, more preferred more than 4 wt.-%, particularly preferred more than 6 wt.-% and most preferred more than 8 wt.-%.

Further, the clay material preferably contains calcium, calculated as CaO, in an amount of less than 5 wt.-%, more preferred less than 4 wt.-%, particularly preferred less than 3 wt.-%.

According to a further embodiment, the clay material contains magnesium, calculated as MgO, in an amount of preferably less than 5 wt.-%, more preferred less than 4 wt.-%, particularly preferred less than 3 wt.-%.

According to a further embodiment, the clay material contains iron, calculated as $Fe_2O_3$, in an amount of preferably less than 5 wt.-%, more preferred less than 4 wt.-%, particularly preferred less than 3 wt.-%.

The clay material has a high specific surface area of 180 to 300 m²/g, preferably 185 to 250 m²/g, particularly preferred 190 to 230 m²/g as determined by the BET-method.

The clay material is further characterized by a large total pore volume of 0.5 to 0.7 ml/l, preferably 0.55 to 0.65 ml/l. The large total pore volume is believed to allow a rapid access of the oil to the small clay particles and, therefore, an efficient bleaching of the crude oil.

To obtain a high bleaching activity, in particular in the activated state, it is important that at least 60%, preferably 65 to 70% of the total pore volume is provided by pores having a pore diameter of at least 140 Å, at least 40%, preferably at least 50%, particularly preferred 55 to 60% of the total pore volume is provided by pores having a pore diameter of less than 250 Å and at least 15%, preferably at least 20%, particularly preferred 21 to 25% of the total pore volume is provided by pores having a pore diameter of 140 to 250 Å. Less than 20% of the total pore volume, preferably less than 15%, particularly preferred 10-14% of the total pore volume is formed by pores having a diameter of >800 Å.

According to a preferred embodiment at least 20%, preferably at least 25%, particularly preferred at least 30%, and most preferred 33 to 40% of the total pore volume of the clay material is provided by pores having a pore diameter of less than 140 Å.

According to a further embodiment preferably at least 10%, particularly preferred at least 13%, most preferred 15 to 20% of the total pore volume of the clay material is provided by pores having a pore diameter of 75 to 140 Å.

In a further embodiment preferably less than 40%, particularly preferred less than 35%, most preferred 25 to 33% of the total pore volume of the clay material is formed by pores having a pore diameter of 250 to 800 Å.

In a still further embodiment preferably at least 12%, particularly preferred at least 14%, most preferred 15 to 20% of the total pore volume of the clay material is provided by pores having a pore volume of less than 75 Å.

According to a further preferred embodiment less than 80%, preferably less than 75%, particularly preferred 60 to 70% of the total pore volume of the clay material is formed by pores having a pore diameter of more than 140 Å.

In a further embodiment less than 60%, preferably less than 50%, particularly preferred 40-45% of the total pore volume is formed by pores having a pore diameter of at least 250 Å.

Preferred ranges of the total pore volume in relation to the pore diameter are summarized in the following table:

Preferred percentages of the total pore volume formed by pores of a distinct pore diameter

| pore diameter | preferred | particularly preferred | most preferred |
| --- | --- | --- | --- |
| 0-75 Å | >12% | >14% | 15-20% |
| 75-140 Å | >10% | >13% | 15-20% |
| 140-250 Å | >15% | >20% | 21-25% |
| 250-800 Å | <40% | <35% | 25-33% |
| >800 Å | <20% | <15% | 10-14% |

The clay material used in the method according to the invention preferably does hardly swell when deposited in water. It therefore may be separated form the oil with ease after the bleaching procedure. The sediment volume in water preferably is less than 10 ml/2 g, particularly preferred less than 8 ml/2 g. The sediment volume in water preferably is at least 2 ml/2 g, more preferred at least 3 ml/2 g, particularly preferred at least 4 ml/2 g.

The clay material, in particular when mined from a natural source, preferably has a cation exchange capacity of more than 40 meq/100 g, particularly preferred of more than 45 meq/100 g and is most preferred selected within a range of 44 to 70 meq/100 g. High activity bleaching earth obtained by extracting a clay mineral with boiling strong acid is characterized by a very low cation exchange capacity of usually less than 40 meq/100 g and in most cases of less than 30 meq/100 g. The clay material used in the method according to the invention therefore can clearly be distinguished from such high performance bleaching earth.

The clay material used in the method according to the invention has an amorphous structure according to XRD data. In an XRD-diffractogram of the clay material used in the method of the invention the reflexes are hardly visible above noise. The ratio signal noise for reflexes regarding the clay material, in particular the smectite phase, is according to an embodiment of the invention close to 1 and may be according to a further embodiment within a range of 1 to 1.2. However, sharp reflexes may be visible in the diffractogram originating from impurities of the clay material, e.g. quartz. Such reflexes are not considered for determination of the signal/noise ratio.

Preferably a clay material is used in the method of the invention, which does not or does hardly show a 001 reflection indicating the layer distance within the crystal structure of bentonite particles. Hardly visible means that the signal-to-noise ratio of the 001 reflection of the smectite particles is preferably less than 1.2, particularly preferred is within a range of 1.0 to 1.1.

Activation in the sense of the method according to the invention is achieved by every method that effects an increase in bleaching activity, which may be determined e.g. by determination of Lovibond colour index according to AOCS Cc 13b-45 and/or determination of Chlorophyll A according to AOCS Cc 13d-55.

Activation of the crude clay material may be performed by simply drying the clay material. Drying is performed at temperatures of preferably less than 180° C., particularly preferred less than 150° C., most preferred within a range of 80 to 120° C. Drying may be performed in usual apparatuses, e.g. a rotating oven. After drying, the clay material may be milled to a suitable particle size.

Preferably, however, activation is performed by treating the crude clay material with acid. By the treatment with acid the treated clay material shows an acid reaction and the bleaching activity is increased. Whereas a 10 wt.-% slurry of the naturally active clay material has a slightly basic pH of preferably 8.0 to 8.5, after acid activation of the clay material a 10 wt.-% slurry shows a pH-value of <6.0, preferably 2.5-5.0, particularly preferred 3.0 to 4.5.

According to a first embodiment, activation of the clay material is performed by surface activation, i.e. by depositing an acid onto the clay material. Activation may be achieved e.g. by spraying an aqueous solution of an acid onto the crude clay material or by milling the clay material together with a solid acid. The clay material preferably is dried before activation to a moisture content of less than 20 wt.-% $H_2O$, particularly preferred 10-15 wt.-%. Suitable acids are phosphorous acid, sulphuric acid and hydrochloric acid. A preferred solid acid is citric acid. However citric acid may be used for activation also in the form of an aqueous solution. In this embodiment of the method it is not necessary to remove residual acid deposited on the clay material and salts produced during activation by e.g. washing with water. Preferably after deposition of the acid on the clay material there is not performed any washing step but the acid treated clay material is only dried and then ground to suitable particle size.

In this embodiment of the method according to the invention in a first step an optionally dried crude clay material having the above described features is provided. Onto the clay material is deposited an acid. The amount of acid deposited on the clay material is preferably selected within a range of 1 to 10 wt.-%, particularly preferred 2 to 6 wt.-%, calculated as water-free acid and based on the weight of the dry (water-free) clay material. Surprisingly, the pore volume as well as the surface area of the clay material are about the same as the corresponding values of the crude clay material such that it seems that hardly any salt formation occurs during surface activation. Preferably, during surface activation the specific surface area does not alter for more than 20%, preferably not more than 10%.

According to this embodiment the surface activation of the clay material may be performed in such a way, that the clay material is activated in an aqueous phase. The clay material, preferably in the form of a fine powder, may be dispersed in water. The acid may then be added to the slurry of the clay material in the form of a concentrated acid. However, the clay material may also be dispersed in an aqueous solution of the acid. According to a preferred embodiment the aqueous acid may be sprayed onto the clay material, which is provided in the form of small lumps or of a fine powder. The amount of water used for preparing the diluted acid is selected to be as small as possible. Residual water on the clay material may be removed after acid activation. The humidity of the clay material preferably is adjusted to be less than 20 wt.-%, particularly preferred less than 10 wt.-%. The activated clay material may then be ground to a suitable size.

According to a further preferred embodiment, the crude clay material having the features as defined above is leached with acid, preferably at elevated temperature, particularly at a temperature corresponding to about 5 to 20° C. less than the boiling point of the mixture. The leaching is preferably performed with a low amount of acid compared to the amount of acid used in the manufacturing of HPBE. Preferably the amount of acid, calculated as water-free acid and referring to the dried (water-free) clay material, is selected within a range of 15 to 40 wt.-%, particularly preferred 20 to 30 wt.-%. Despite of the low amount of acid used for leaching of the clay a significant increase in bleaching activity is achieved which is comparable to HPBE currently offered on the market.

The leaching of the clay is performed in a usual way. A slurry of the clay material in the acid is heated to the desired temperature. The time for extracting the clay material with hot acid is selected according to the amount of clay material treated. Usually a leaching period of 2 to 12 h is sufficient to achieve the desired increase in bleaching activity. The slurry of the leached clay material is then filtered and the solid adsorbent material is washed with water to remove salts that have formed during the acid treatment, and residual acid.

Surprisingly, the specific surface area as well as the pore volume is not altered much during acid leaching. The clay material treated with boiling acid has a pore volume and a specific surface area that is preferably not enlarged by more than 20% in comparison to the untreated clay material. As a further advantage, the yield of the acid leaching is quite high. Preferably, the yield is in a range of 80 to 95%, based on the dry clay material.

For the acid leaching, preferably strong inorganic acids are used. Particularly preferred acids are sulphuric acid and phosphoric acid.

Further, the amount of aluminium, calculated as $Al_2O_3$, contained in the acid-leached clay material preferably is less than 15 wt.-%, more preferred less than 12 wt.-%, particularly preferred less than 11 wt.-% and most preferred less than 10 wt.-%. The amount of aluminium, calculated as $Al_2O_3$, contained in the acid-leached clay material preferably is more than 2 wt.-%, more preferred more than 4 wt.-%, particularly preferred more than 6 wt.-% and most preferred more than 8 wt.-%.

Before using the activated clay material e.g. for the bleaching of oils and fats, the particles are adjusted to a suitable particle size. Grinding may be performed either before or after activation. If a surface activated bleaching earth is produced, grinding is preferably performed after acid activation. In the production of a high performance bleaching earth the particle size is preferably adjusted before activation such that an efficient leaching of the clay material may be performed. Grinding is preferably performed such that a typical particle size distribution of a bleaching earth is adjusted after activation. The dry residue of the bleaching earth on a sieve of a mesh size of 63 µm preferably is within a range of 20 to 40 wt.-% and the dry residue on a sieve of a mesh size of 25 µm preferably is within a range of 50-65 wt.-%.

The clay material used in the method according to the invention has a high bleaching activity, which may be increased by treating the clay material with acid. Therefore, the invention is also directed to a clay material having an amorphous structure according to XRD data and having:

a surface area of 180 to 300 $m^2/g$;
a total pore volume of 0.5 to 0.7 ml/l;
wherein at least 60% of the total pore volume is provided by pores having a pore diameter of at least 140 Å, at least 40% of the total pore volume is provided by pores having a pore diameter of less than 250 Å, at least 15% of the total pore volume is provided by pores having a pore diameter of 140 to 250 Å and less than 20% of the total pore volume is provided by pores having a diameter of >800 Å.

Such clay material may be produced by the method as described above. Preferred embodiments of the clay material, in particular in the activated form, have already been described above. For details reference therefore is made to the corresponding passages of the above description of the method for producing an adsorbent according to the invention.

Particularly preferred the clay material is in an acid activated form and a 10 wt.-% slurry of the acid activated clay material in distilled water has a pH of <6, preferably <5.0, particularly preferred <4.5. Preferably, a 10 wt.-% slurry of the acid activated clay material in distilled water has a pH of >1, more preferred >2, particularly preferred >2.5.

Further, the invention is directed to a method for refining fats and/or oils, wherein:

a raw oil derived from animal or plant material is provided;
the raw oil is treated with a bleaching material comprising
a clay material having:
a surface area of 180 to 300 $m^2/g$;
a total pore volume of 0.5 to 0.7 ml/l;
wherein at least 60% of the total pore volume is provided by pores having a pore diameter of at least 140 Å, at least 40% of the total pore volume is provided by pores having a pore diameter of less than 250 Å, at least 15% of the total pore volume is provided by pores having a pore diameter of 140 to 250 Å and less than 20% of the total pore volume is provided by pores having a pore diameter of >800 Å; and said clay material having an amorphous structure according to XRD data; and the bleached oil is separated from the used bleaching material.

By the method of the invention a significant decrease of the Lovibond colour index as well as a significant decrease in the concentration of phosphorous and iron in the bleached oil may be obtained. The method according to the invention therefore allows a simple and efficient refining of oils and fats.

In the refining of oils is usually performed first a degumming step to remove e.g. phospholipids. The crude oil is treated with water by stirring for preferably 10 to 20 minutes at a temperature of preferably 70 to 80° C. at ambient pressure. The aqueous phase is separated e.g. by centrifugation and then in a second degumming step is added an acid, in particular phosphorous acid or citric acid, and the mixture is preferably stirred for further 10 to 30 minutes at a temperature of preferably 70 to 100° C. and ambient pressure. Towards end of the degumming, water may be added in an amount of preferably 1 to 2 wt.-% of the crude oil to increase efficiency of degumming. Temperature and stirring time may be adjusted to the particular oil or fat to be treated.

In the bleaching process may be first performed a wet bleaching followed by vacuum bleaching. To the degummed oil is added water in an amount of preferably 0.1 to 0.5 wt.-% and bleaching earth in an amount of preferably 0.3 to 2.0 wt.-%. The mixture is stirred at preferably 80 to 100° C. at ambient pressure for preferably 15 to 30 minutes. Then, the pressure is reduced to preferably about 100 mbar and the temperature is increased to preferably 90 to 120° C. and the mixture is stirred for preferably 30 to 45 minutes for degassing and to distil off some of the water. The bleached oil may then be separated from the used bleaching earth by e.g. passing through a filter. Filtration is preferably performed at a temperature of about 60 to 90° C.

After bleaching the oil may be deodorized. For deodorization superheated steam having a temperature of preferably 240 to 260° C. is passed through the oil to remove free fatty acids and bad tasting or smelling compounds. Deodorization is preferably performed at reduced pressure of less than 5 mbar, preferably 1 to 3 mbar.

After purification the oil preferably has a phosphorous concentration of less than 3 ppm and an iron concentration of less than 0.1 ppm.

The method for purification of crude oils and fats is preferably performed with the acid activated clay material, wherein the activation of the clay material preferably has been performed with phosphoric acid, sulphuric acid or citric acid.

The amount of acid deposited on the clay material is preferably selected within a range of 2 to 5 wt.-%, calculated as water-free acid and based on the weight of the dry clay material.

In a particularly preferred embodiment the crude oil is selected from the group of canola oil, soybean oil, rapeseed oil, palm oil, sunflower oil. According to a particularly preferred embodiment the crude oil is bleached with the above described clay material wherein the clay material preferably has been surface activated with citric acid.

Particularly preferred the crude oil contains phosphorous in an amount of less than 100 ppm.

According to a further preferred embodiment the above described clay material, in particular in its acid activated form, may be used to purify biodiesel after transesterification. Biodiesel may be produced from fats and oil of vegetable or animal origin. In a transesterification process the triglycerides are cleaved by alcoholysis with a low molecular alcohol, in particular methanol, to obtain glycerol and the fatty acid alkyl esters. The transesterification is catalyzed by an alkaline compound e.g. sodium methanolate. Details to the manufacturing of Biodiesel may be found at M. Mittelbach, C. Remschmidt, "Biodiesel The comprehensive Handbook", Graz, 2004; ISBN 3-200-00249-2.

EXAMPLES

The following examples are presented in order to more fully explain and illustrate the invention. The examples are not to be construed as limiting the invention.

The physical features used to characterize the adsorbents according to the invention are determined as follows:

Specific Surface:

Specific surface was measured by the BET-method (single-point method using nitrogen, according to DIN 66131) with an automatic nitrogen-porosimeter of Micrometrics, type ASAP 2010. The pore volume was determined using the BJH-method (E. P. Barrett, L. G. Joyner, P. P. Hienda, J. Am. Chem. Soc. 73 (1951) 373). Pore volumes of defined ranges of pore diameter were measured by summing up incremental pore volumina, which were determined from the adsorption isotherm according BJH. The total pore volume refers to pores having a diameter of 2 to 350 nm.

Oil Analysis

The colour index of the oils (Lovibond colour index) was measured according to AOCS Cc 13b-45. Chlorophyll A was determined according to AOCS Cc 13d-55.

Moisture Content

The amount of water contained in the adsorbents was determined at 105° C. according to DIN/ISO-787/2

Silicate Analysis

The clay material was totally disintegrated. After dissolution of the solids the compounds were analysed and quantified by specific methods, e.g. ICP.

a) Sample Disintegration

A 10 g sample of the clay material is comminuted to obtain a fine powder which is dried in an oven at 105° C. until constant weight. About 1.4 g of the dried sample is deposited in a platinum bowl and the weight is determined with a precision of 0.001 g. Then the sample is mixed with a 4 to 6-fold excess (weight) of a mixture of sodium carbonate and potassium carbonate (1:1). The mixture is placed in the platinum bowl into a Simon-Müller-oven and molten for 2 to 3 hours at a temperature of 800-850° C. The platinum bowl is taken out of the oven and cooled to room temperature. The solidified melt is dissolved in distilled water and transferred into a beaker. Then concentrated hydrochloride acid is carefully added. After evolution of gas has ceased the water is evaporated such that a dry residue is obtained. The residue is dissolved in 20 ml of concentrated hydrochloric acid followed by evaporation of the liquid. The process of dissolving in concentrated hydrochloric acid and evaporation of the liquid is repeated once again. The residue is then moistened with 5 to 10 ml of aqueous hydrochloric acid (12%). About 100 ml of distilled water is added and the mixture is heated. To remove insoluble $SiO_2$, the sample is filtered and the residue remaining on the filter paper is thoroughly washed with hot hydrochloric acid (12%) and distilled water until no chlorine is detected in the filtrate.

b) Silicate Analysis

The $SiO_2$ is incinerated together with the filter paper and the residue is weighed.

c) Determination of Aluminium, Iron, Calcium and Magnesium

The filtrate is transferred into a calibrated flask and distilled water is added until the calibration mark. The amount of aluminium, iron, calcium and magnesium in the solution is determined by FAAS.

d) Determination of Potassium, Sodium and Lithium

A 500 mg sample is weighed in a platinum bowl with a precision of 0.1 mg. The sample is moistened with about 1 to 2 ml of distilled water and then four drops of concentrated sulphuric acid are added. About 10 to 20 ml of concentrated hydrofluoric acid is added and the liquid phase evaporated to dryness in a sand bath. This process is repeated three times. Finally $H_2SO_4$ is added to the dry residue and the mixture is evaporated to dryness on an oven plate. The platinum bowl is calcined and, after cooling to room temperature, 40 ml of distilled water and 5 ml hydrochloric acid (18%) is added to the residue and the mixture is heated to boiling. The solution is transferred into a calibrated 250 ml flask and water is added up to the calibration mark. The amount of sodium, potassium and lithium in the solution is determined by EAS.

Loss on Ignition

In a calcined and weighed platinum bowl about 0.1 g of a sample are deposited weighed in a precision of 0.1 mg. The platinum bowl is calcined for 2 hours at 1000° C. in an oven. Then the platinum bowl is transferred to an exsiccator and weighed.

Ion Exchange Capacity

The clay material to be tested was dried at 150° C. for two hours. Then the dried material was allowed to react under reflux with a large excess of aqueous $NH_4Cl$ solution for 1 hour. After standing at room temperature for 16 hours, the material was filtered. The filter cake was washed, dried, and ground, and the $NH_4$ content in the clay material was determined by the Kjedahl method. The amount and kind of the exchanged metal ions was determined by ICP-spectroscopy.

X-Ray Diffraction

The XRD spectra were measured with a powder diffractometer X'-Pert-MPD(PW 3040) (Phillips), equipped with a Cu-anode.

Determination of the Sediment Volume:

A graduated 100 ml glass cylinder is filled with 100 ml of distilled water or with an aqueous solution of 1% sodium carbonate and 2% trisodium polyphosphate. 2 g of the compound to be analysed is placed on the water surface in portions of about 0.1 to 0.2 g with a spatula. After sinking down of a portion the next portion of the compound is added. After adding 2 g of the compound to be analysed the cylinder is held at room temperature for one hour. Then the sediment volume (ml/2 g) is read from the graduation.

pH-Determination

A 10 wt.-% slurry of the clay material in distilled water is heated to the boiling point and then cooled to room temperature under a nitrogen atmosphere. The pH-value is determined with a calibrated glass-electrode.

Deterioration of Bleachability Index (DOBI)

The DOBI is the numeric ratio of the spectrophotometric absorbance at 446 nm to that at 269 nm. Measurements were made by dissolving palm oil in hexane and then determining the absorbance in a spectrophotometer.

Example 1

Characterisation of the Clay Material

A clay material suitable for the method according to the invention (Tonsil® Supreme 526 FF, Sud-Chemie de Mexico S.A. de C.V.) was analysed towards its physical features. The data are presented in table 1. For comparison is also included a known clay material (Tonsil® 419 FF), Süd-Chemie AG, Moosburg, Del.) as disclosed in WO 2006/131136.

TABLE 1

Analysis of clay materials

| clay material | Tonsil ® Supreme 526 FF | Tonsil ® 419 FF |
|---|---|---|
| specific surface (BET) ($m^2$/g) | 209 | 213 |
| pore volume (ml/g) | 0.593 | 0.85 |
| cation exchange capacity (meq/100 g) | 50 | 54 |
| sediment volume in water (ml/2 g) | <8 | <10 |
| silicate analysis (wt.-%) | | |
| $SiO_2$ | 72.5 | 70.9 |
| $Fe_2O_3$ | 3.0 | 2.7 |
| $Al_2O_3$ | 9.6 | 9.6 |
| CaO | 2.1 | 1.4 |
| MgO | 2.7 | 4.3 |
| $Na_2O$ | 1.1 | 0.36 |
| $K_2O$ | 1.1 | 1.3 |
| $TiO_2$ | 0.38 | 0.20 |
| ignition loss (2 h, 1000° C.) | 6.9 | 7.7 |
| Total | 99.38 | 98.46 |

Further, both clay materials characterized in table 1 have been analysed as to their pore volume and the percentage of the pore volume formed by pores of a defined diameter. The results are summarized in tables 2a-2c.

TABLE 2a relative amount of the total pore volume formed by pores of a defined diameter (%)

| | diameter (Å) | | | | |
|---|---|---|---|---|---|
| | 0-75 | 0-140 | 0-250 | 0-800 | >800 |
| Tonsil ® Supreme 526 FF | 17.1 | 33.9 | 57.0 | 87.9 | 12.0 |
| Tonsil ® 419 FF | 13.3 | 19.3 | 34.1 | 78.0 | 22.0 |

TABLE 2b relative amount of the total pore volume formed by pores of a defined diameter (%)

| | diameter (Å) | | | | |
|---|---|---|---|---|---|
| | 0-75 | 75-140 | 140-250 | 250-800 | >800 |
| Tonsil ® Supreme 526 FF | 17.1 | 16.8 | 23.1 | 30.9 | 12.1 |
| Tonsil ® 419 FF | 10.3 | 9.0 | 14.8 | 43.9 | 22.0 |

TABLE 2c relative amount of the total pore volume formed by pores of a defined diameter (%)

| | diameter (Å) | | | | |
|---|---|---|---|---|---|
| | 0-75 | 75-800 | >75 | >140 | >250 |
| Tonsil ® Supreme 526 FF | 17.1 | 70.8 | 82.9 | 66.1 | 43.0 |
| Tonsil ® 419 FF | 10.3 | 67.7 | 89.7 | 80.7 | 65.9 |

Preparation of Activated Clay Materials a) Surface Activated Bleaching Earth (Tonsil® 1204 FF)

100 g Tonsil® Supreme 526 FF, dried to 10% $H_2O$ were mixed with 125 g water and then activated by adding 4 wt.-%

$H_2SO_4$ (3.75 g $H_2SO_4$, 96%) and kneading the mixture in a beaker. The mixture was dried at 110° C. to a moisture content of 14.6% and then ground to a fine powder (dry residue on a sieve of mesh size 63 μm: 23.9%; mean particle size: 35.3 μm).

b) High Performance Bleaching Earth (Tonsil® Supreme 1206 FF)

The clay material characterized in table 1 was extracted with 20% aqueous sulphuric acid.

100 g Tonsil Supreme 526 FF at 20% solids content aqueous slurry is activated and extracted by adding 20% concentrated sulphuric acid (20.8 g $H_2SO_4$, 96%) and cooked at boiling point for 8 hours under gentle agitation to avoid sedimentation and at atmospheric pressure.

The activated clay material was washed with water until 0.5% residual acidity and then dried at 110° C. to a moisture content of 15.1 wt.-%. It was obtained a fine powder of a dry residue on a sieve of mesh size 63 μm of 23.4% and a mean particle size of 29.6 μm The physical data of the clay materials are summarized in table 3.

TABLE 3 physical data of clay materials

| Sample | Tonsil ® Supreme 526 FF | Tonsil ® Supreme 1204 FF | Tonsil ® Supreme 1206 FF |
|---|---|---|---|
| surface area m²/g | | | |
| Single point BET | 209 | 197 | 222 |
| Multi point BET | 213 | 200 | 224 |
| BJH Adsorption Cumulative Surface area | 227 | 218 | 242 |
| Pore volume data (ml/g) | | | |
| Total pore volume | 0.593 | 0.603 | 0.615 |
| BJH Adsorption cumulative Pore Volume | 0.573 | 0.602 | 0.610 |
| Pore size data (Å) | | | |
| Adsorption Average pore diameter (4V/A by BET) | 110 | 120 | 109 |
| BJH Adsorption Pore Average Diameter (4V/A) | 101 | 110 | 101 |
| Moisture content, wt.-% | 13.9 | 14.6 | 15.1 |
| Acidity ($H_2SO_4$), % | — | 0.443 | 0.561 |
| Particle size; >63 μm | 30.8 | 23.9 | 23.4 |
| Mean particle size (μm) | 40.6 | 35.3 | 29.6 |
| Bulk density, g/l | 482 | 477 | 436 |
| $SiO_2$ | 72.5 | 72.8 | 73.2 |
| $Fe_2O_3$ | 3.0 | 2.8 | 2.7 |
| $Al_2O_3$ | 9.6 | 9.4 | 9.1 |
| CaO | 2.1 | 1.9 | 2.0 |
| MgO | 2.7 | 2.6 | 2.9 |
| $Na_2O$ | 1.1 | 1.3 | 1.1 |
| $K_2O$ | 1.1 | 1.3 | 1.0 |
| $TiO_2$ | 0.38 | — | — |
| ignition loss (2 h, 1000° C.) | 6.9 | 7.1 | 7.2 |

TABLE 4

Pore volume distribution of clay minerals

| | Tonsil ® Supreme 526 FF | | Tonsil ® Supreme 1204 FF | | Tonsil ® Supreme 1206 FF | |
|---|---|---|---|---|---|---|
| BJH Adsorption pore size distribution | pore volume ml/g | % | pore volume ml/g | % | pore volume ml/g | % |
| 10-20 Å | 0.0127 | 2.2 | 0.0140 | 2.3 | 0.0199 | 3.3 |
| 20-30 Å | 0.0226 | 3.8 | 0.0201 | 3.3 | 0.0213 | 3.5 |
| 30-40 Å | 0.0201 | 3.4 | 0.0195 | 3.2 | 0.0195 | 3.2 |
| 40-50 Å | 0.0142 | 2.4 | 0.0151 | 2.5 | 0.0142 | 2.3 |
| 50-60 Å | 0.0194 | 3.3 | 0.0187 | 3.1 | 0.0187 | 3.1 |
| 60-70 Å | 0.0201 | 3.4 | 0.0187 | 3.1 | 0.0195 | 3.2 |
| 70-80 Å | 0.0109 | 1.8 | 0.0103 | 1.7 | 0.0102 | 1.7 |
| 80-90 Å | 0.0125 | 2.1 | 0.0266 | 4.4 | 0.0248 | 4.1 |
| 90-100 Å | 0.0184 | 3.1 | 0.0000 | 0.0 | 0.0000 | 0.0 |
| 100-200 Å | 0.1770 | 30.0 | 0.1620 | 26.9 | 0.1730 | 28.3 |
| 200-300 Å | 0.0513 | 8.7 | 0.0525 | 8.7 | 0.0607 | 9.9 |
| 300-400 Å | 0.0638 | 10.8 | 0.0571 | 9.5 | 0.0679 | 11.1 |
| 400-500 Å | 0.0000 | 0.0 | 0.0000 | 0.0 | 0.0000 | 0.0 |
| 500-600 Å | 0.0743 | 12.6 | 0.0000 | 0.0 | 0.0000 | 0.0 |
| 600-700 Å | 0.0000 | 0.0 | 0.0778 | 12.9 | 0.0861 | 14.1 |
| 1000-2000 Å | 0.0721 | 12.2 | 0.0000 | 0.0 | 0.0750 | 12.3 |
| 2000-3000 Å | 0.0000 | 0.0 | 0.0000 | 0.0 | 0.0000 | 0.0 |
| 3000-4000 Å | 0.0000 | 0.0 | 0.1100 | 18.3 | 0.0000 | 0.0 |

As reference examples for testing were used the following bleaching earths available from Süd-Chemie de Mexico, S.A. de C.V., Puebla, MX:

TABLE 5 features of commercially available bleaching earth

| Product | Tonsil ® 522 FF | Tonsil ® Actisil ® 220 FF | Tonsil ® Supreme 126 FF | Tonsil ® Supreme 1202 FF |
|---|---|---|---|---|
| Type | NABE | SMBE | HPBE | HPBE |
| Activation method | — | dry | wet | wet |
| Amount of acid | — | 4% | 20% | 20% |
| Activation time | — | — | 8 | 12 |
| Surface area m²/g | 200 | 143 | 263 | 377 |
| Pore volume ml/g | 0.377 | 0.268 | 0.470 | 0.526 |
| Moisture content, % | 11.0 | 10.8 | 14.0 | 16.4 |
| Acidity ($H_2SO_4$), % | — | 0.521 | 0.390 | 0.386 |
| Particles >63 μm (%) | 28.0 | 24.6 | 22.5 | 23.3 |
| Mean particle size (μm) | 53.2 | 44.6 | 25.0 | 30.4 |
| Bulk density, g/l | 566 | 564 | 520 | 548 |

Example 2

Oil Bleaching

The degummed and deacidified oil was bleached for 30 minutes at a temperature of 105° C. and a pressure of 20 mbar. The amount of added bleaching earth is given in table 4. After the bleaching the bleaching earth was filtered off and the colour index of the oil was measured in a 5¼" cuvette according to the Lovibond method. Part of the bleached oil was further treated with super-heated water vapour (250° C., 120 min., 3 mbar) for deodorization. The deodorized oil was analysed according to the Lovibond method. The oil purification was tested with soybean oil and canola oil. The results are summarized in tables 4 and 5.

TABLE 6

Bleaching and deodorization of soybean oil

| Tonsil ® clay | Amount wt.-% | Bleaching Lovibond PFX990 ||| Deodorization Lovibond PFX990 |||
|---|---|---|---|---|---|---|---|
| | | Colour cell: 5¼" || Chlorophyll ppm | Colour cell: 5¼" || Chlorophyll ppm |
| | | R | Y | "A" | R | Y | "A" |
| — | — | 9.3 | 70 | 1.46 | — | — | — |
| 1204 | 0.2 | 8.8 | 70 | 0.35 | — | — | — |
| 1206 | 0.2 | 7.4 | 70 | 0.26 | — | — | — |
| 1202 | 0.2 | 7.9 | 70 | 0.33 | — | — | — |
| 126 | 0.2 | 8.2 | 70 | 0.35 | — | — | — |
| 220 | 0.2 | 9.1 | 70 | 0.57 | — | — | — |
| 1204 | 0.4 | 6.3 | 70 | 0.15 | — | — | — |
| 1206 | 0.4 | 4.3 | 70 | 0.12 | — | — | — |
| 1202 | 0.4 | 4.8 | 70 | 0.14 | — | — | — |
| 126 | 0.4 | 5.2 | 70 | 0.15 | — | — | — |
| 220 | 0.4 | 7.0 | 70 | 0.27 | — | — | — |
| 1204 | 0.6 | 4.3 | 70 | 0.09 | 1.1 | 10.0 | 0.00 |
| 1206 | 0.6 | 3.1 | 70 | 0.07 | 1.2 | 10.0 | 0.00 |
| 1202 | 0.6 | 3.6 | 70 | 0.08 | 1.1 | 10.0 | 0.00 |
| 126 | 0.6 | 4.0 | 70 | 0.09 | 1.2 | 11.0 | 0.00 |
| 220 | 0.6 | 5.2 | 70 | 0.17 | 1.5 | 11.0 | 0.05 |

TABLE 7

Bleaching and deodorization of canola oil

| Tonsil ® clay | Amount wt.-% | Bleaching Lovibond PFX990 ||| Deodorization Lovibond PFX990 |||
|---|---|---|---|---|---|---|---|
| | | Colour cell: 5¼" || Chlorophyll ppm | Colour cell: 5¼" || Chlorophyll ppm |
| | | R | Y | "A" | R | Y | "A" |
| — | — | 5.2 | 70 | 16.60 | — | — | — |
| 1204 | 1.2 | 4.6 | 70 | 0.28 | — | — | — |
| 1206 | 1.2 | 4.8 | 70 | 0.22 | — | — | — |
| 1202 | 1.2 | 4.2 | 70 | 0.25 | — | — | — |
| 126 | 1.2 | 4.7 | 70 | 0.39 | — | — | — |
| 220 | 1.2 | 6.0 | 70 | 0.97 | — | — | — |
| 1204 | 1.4 | 4.4 | 70 | 0.18 | — | — | — |
| 1206 | 1.4 | 4.6 | 70 | 0.11 | — | — | — |
| 1202 | 1.4 | 4.0 | 70 | 0.14 | — | — | — |
| 126 | 1.4 | 4.5 | 70 | 0.25 | — | — | — |
| 220 | 1.4 | 5.2 | 70 | 0.76 | — | — | — |
| 1204 | 1.6 | 4.1 | 70 | 0.12 | 1.6 | 15.0 | 0.07 |
| 1206 | 1.6 | 4.3 | 70 | 0.06 | 1.8 | 15.0 | 0.03 |
| 1202 | 1.6 | 3.8 | 70 | 0.08 | 1.3 | 12.1 | 0.04 |
| 126 | 1.6 | 4.2 | 70 | 0.16 | 1.5 | 15.0 | 0.10 |
| 220 | 1.6 | 4.6 | 70 | 0.56 | 2.1 | 21.9 | 0.39 |

Example 3

Determination of Total Efficiency of Bleaching Earth

Bleaching Activity

For degumming to crude palm oil (DOBI=2.79 or 1.7) was added 0.05 wt.-% of an aqueous citric acid solution (20%) and the mixture is heated to 80° C. with stirring for 30 minutes at normal pressure. After separation of the aqueous phase the respective bleaching earth in an amount as given in tables 9 and 10 was added to the degummed palm oil and the mixture was stirred for 30 minutes at 110° C. at reduced pressure (80 mbar). The oil was filtered through a paper filter. The filtered palm oil then was deodorized by introducing superheated steam (entrance temperature: 260° C.) for 120 minutes at reduced pressure (3 mbar).

The red colour of the deodorized palm oil was measured in a 5¼"-cell by means of a colorimeter "Lovibond Tintometer Colourscan PFX 960" obtained from "the Tintometer Limited, UK" and according to AOCS Cc 13j-97. The oil is treated with filter aid (diatomaceous earth) and filtered through a folded filter paper and its red colour is determined in Lovibond scale at 45-50° C.

A red colour of the best performing bleaching earth is considered 100% efficiency. The efficiency of the samples analyzed with regard to the red colour was calculated according the following equitation:

$$\text{Bleaching efficiency (\%)} = ((\text{red colour of most efficient } B.E.)/(\text{red colour index of sample}))*100$$

Heavy metals content of deodorized samples is determined by means of a Spectrophotometer ICP plasma model Optima 3100 XL from Perkin Elmer, USA. In an ICP instrument and according to the manufacturer's instructions, the oil is injected into a high-temperature argon plasma, where the atoms are vaporized, excited and subsequently emit light that can be measured.

Oil Stability Index of the final deodorized oil is determined according to AOCS Cd 12b-92 method by means of an "Oxidative stability instrument" from Omnion Inc. licensed by Archer Daniels Midland Co. (ADM). Oils and fats have a resistant to oxidation which depends on the degree of saturation, natural or added antioxidants, pro-oxidants content or prior abuse. Oxidation is slow until this resistance is overcome, at which point of oxidation accelerates and become very rapid. The length of time before this rapid acceleration of oxidation is the measure of the resistance to oxidation and is commonly referred to as the "Induction period". In this method for determining the induction period, a stream of purified air is passed through the oil sample in a sealed and heated reaction vessel. This treatment results in oxidation of the oil molecules in the sample, with peroxides initially being formed as the primary oxidation products. After some time the fatty acids are completely destroyed; the secondary oxidation products formed include low-molecular organic acids in addition to other volatile organic compounds. These are transported in the stream of air to a second vessel containing distilled water. The conductivity of the vessel is recorded continuously. The organic acids can be detected by the increase in conductivity. The time that elapses until these secondary reaction products appear is known as the induction time, induction period or Oil stability Index (OSI).

Filtration Rate Efficiency

The filtration rate was determined by the following procedure:

100 g of once bleached soybean oil is added with 10 g bleaching clay sample and gently agitated at 250 rpm in a thermal block with magnetic stir bars at 120° C. and during 20 minutes. The oil-clay suspension is then immediately passed through suction filter GV 100 using a standard round filter paper DN 100 mm, type 595 both from Schleicher & Schuell and a 2000 ml filter flask Erlenmeyer-form under less than 50 mbar of vacuum. Filtration time is measured by using of a stop-watch and is referred as the time since the first drop of oil is dropping down to the bottom of the filter flask until the filter cake is entirely through and has a "dry appearance".

A bleaching earth having a filtration rate of 45 seconds in the standard test was considered 100% efficient.

The filtration rate efficiency of the samples analyzed was calculated according to the following equitation:

$$\text{Filtration rate efficiency (\%)} = ((\text{Filtration rate of sample})/45)*100$$

Oil Retention Efficiency

Following the filtration rate method, the oil retention is determined by sucking through 5 more minutes under same vacuum pressure. Subsequently, the vacuum is switched off and the filter cake together with the filter paper is taken off the suction filter. The oil-containing filter cake is separated quantitatively from the oil-moistened filter paper and its weight is determined. The oil retention (%) is then calculated by subtracting the bleaching clay amount to the oil-containing filter cake divided into the same weight of oil-containing filter and finally multiplied by 100.

An oil retention of 35% as obtained in the standard test was considered 100% efficiency. The oil retention efficiency of the samples analyzed was calculated according to the following equation:

Oil retention efficiency (%)=((Oil retention of sample (%))/35%)*100

Total Efficiency

The total efficiency was calculated according to the following equitation:

Total efficiency (%)=(bleaching activity (%))*0.6+ (filtration rate efficiency (%))*0.2+(oil retention efficiency (%))*0.2.

Several bleaching earths available on the market as well as the bleaching earth according to the invention were analyzed towards their physical properties as well as to their oil retention and filtration rate. The results are summarized in table 8.

TABLE 8 physical analysis of bleaching earths

| Product | Moisture content (%) | Free acidity ($H_2SO_4$) (%) | Residue on 230 mesh | Filtration rate (s) | Oil retention (%) | Specific surface $m^2/g$ | Pore volume (ml/g) | Bulk density (g/l) | Mean particle size (μm) |
|---|---|---|---|---|---|---|---|---|---|
| B-80 CG* | 14.6 | — | 8.0 | 32 | 46.7 | 157 | 0.408 | 435 | 36.54 |
| B-80* | 14.7 | — | 2.8 | 60 | 43.5 | 146 | 0.488 | 444 | 28.15 |
| Performance 4000* | 11.9 | 0.442 | 6.5 | 53 | 45.3 | 137 | 0.430 | 427 | 33.67 |
| Tonsil ® 419 FF | 9.1 | — | 31.4 | 65 | 51.2 | 184 | 0.800 | 334 | 38.97 |
| Tonsil ® 522 FF | 11.0 | — | 28.0 | 44 | 31.6 | 200 | 0.377 | 566 | 53.15 |
| Tonsil ® Supreme 526 FF | 14.0 | — | 33.0 | 34 | 43.8 | 231 | 0.700 | 464 | 46.90 |

*product of Oil-Dri Corp. USA.

Further, the bleaching earths characterized in table 8 were used for bleaching two palm oil samples having a DOBI of 2.79 and 1.7, respectively, according to the procedure described above. The results are summarized in tables 9 and 10.

TABLE 9

Bleaching and deodorization of a palm oil (DOBI = 2.79)

| | | Bleaching | | | Deodorization | | | | | | |
| | | Lovibond PFX 990 | | | Manual Lovibond | | | | | | |
| | | Color cell | | Chlorophyll | Color cell | Stability | Heavy metals ICP | | | | |
| | Dosage | 1" | | ppm | 5¼" | | Cu | P | Ca | Fe | Mg |
| | (%) | R | A | "A" | R | Y | OSI 120° C. (h) | ppm | ppm | ppm | ppm | ppm |
| Crude oil | — | 30.0 | 70.0 | 0.10 | — | — | — | 0.52 | 9.42 | 7.57 | 2.01 | 2.34 |
| P-4000 | 0.4 | 28.0 | 70.0 | 0.00 | 2.5 | 28.4 | 15.0 | <0.05 | <0.4 | 0.14 | <0.06 | 0.22 |
| B-80 CG | 0.4 | 28.0 | 70.0 | 0.00 | 2.4 | 29.0 | 13.3 | <0.05 | <0.4 | 0.77 | 0.10 | 0.31 |
| B-80 | 0.4 | 28.0 | 70.0 | 0.00 | 2.2 | 27.0 | 14.0 | <0.05 | <0.4 | 0.16 | <0.06 | 0.23 |
| Tonsil 522FF | 0.4 | 29.0 | 70.0 | 0.00 | 2.3 | 27.0 | 14.0 | <0.05 | <0.4 | 0.65 | 0.09 | 0.28 |
| Tonsil ® Supreme 526 FF | 0.4 | 27.0 | 70.0 | 0.00 | 1.8 | 24.0 | 16.0 | <0.05 | <0.4 | 0.14 | <0.06 | 0.20 |
| Tonsil 419 FF | 0.4 | 29.0 | 70.0 | 0.00 | 1.7 | 24.0 | 16.2 | <0.05 | <0.4 | <0.06 | <0.06 | 0.16 |
| P-4000 | 0.8 | 27.0 | 70.0 | 0.00 | 1.7 | 23.0 | — | <0.05 | <0.4 | <0.06 | <0.06 | <0.1 |
| B-80 GC | 0.8 | 28.0 | 70.0 | 0.00 | 1.7 | 23.0 | — | <0.05 | <0.4 | <0.06 | <0.06 | <0.1 |
| Tonsil 522 FF | 0.8 | 28.0 | 70.0 | 0.00 | 1.7 | 23.0 | — | <0.05 | <0.4 | <0.06 | <0.06 | <0.01 |
| Tonsil ® Supreme 526 FF | 0.8 | 27.0 | 70.0 | 0.00 | 1.5 | 22.0 | — | <0.05 | <0.4 | <0.06 | <0.06 | <0.1 |
| Tonsil 419 FF | 0.8 | 29.0 | 70.0 | 0.00 | 1.6 | 22.0 | — | <0.05 | <0.4 | <0.06 | <0.06 | <0.1 |

TABLE 10

Bleaching and deodorization of a palm oil (DOBI = 1.7)

| | | Bleaching | | Deodorization | | | | | | | |
|---|---|---|---|---|---|---|---|---|---|---|---|
| | | Lovibond PFX 990 | | Manual Lovibond | | | | | | | |
| | | Color cell | Chlorophyll | Color cell | | Stability | Heavy metals ICP | | | | |
| | Dosage | 1" | ppm | 5¼" | | (h) | Cu | P | Ca | Fe | Mg |
| | (%) | R    A | "A" | R | Y | OSI 120° C. | ppm | ppm | ppm | ppm | ppm |
| Crude oil | — | 24.0  70.0 | 0.11 | — | — | — | 0.22 | 19.1 | 27.0 | 11.2 | 5.9 |
| P-4000 | 0.8 | 19.5  70.0 | 0.00 | 6.4 | 70.0 | 11.2 | <0.05 | 1.95 | 3.37 | 1.18 | 0.97 |
| B-80-CG | 0.8 | 16.1  70.0 | 0.00 | 6.4 | 70.0 | 10.4 | <0.05 | 4.26 | 6.01 | 1.63 | 1.19 |
| B-80 | 0.8 | 16.1  70.0 | 0.00 | 6.0 | 70.0 | 10.8 | <0.05 | 1.55 | 2.88 | 0.83 | 0.86 |
| Tonsil 522 FF | 0.8 | 20.0  70.0 | 0.00 | 6.7 | 70.0 | 10.7 | <0.05 | 2.75 | 3.53 | 1.33 | 1.02 |
| Tonsil ® Supreme 526 FF | 0.8 | 18.4  70.0 | 0.00 | 4.8 | 70.0 | 12.9 | <0.05 | 0.50 | 1.83 | 0.69 | 0.63 |
| Tonsil 419 FF | 0.8 | 18.0  70.0 | 0.00 | 4.4 | 70.0 | 13.2 | <0.05 | <0.4 | 1.56 | 0.41 | 0.44 |

The efficiencies calculated from the values provided in tables 8 to 10 are summarized in table 11.

TABLE 11

Efficiency of bleaching earth in the purification of crude palm oil (%)

| product | Dobi | Dosage (%) | Bleaching efficiency | Relative bleaching efficiency | Filtration efficiency | Relative filtration efficiency | Oil retention efficiency | Relative oil retention efficiency | Total efficiency |
|---|---|---|---|---|---|---|---|---|---|
| P-4000 | 2.79 | 0.4 | 83 | 50 | 85 | 17 | 77 | 16 | 82 |
| B-80-CG | 2.79 | 0.4 | 75 | 45 | 141 | 28 | 75 | 15 | 88 |
| B-80 | 2.79 | 0.4 | 84 | 51 | 75 | 15 | 80 | 16 | 82 |
| Tonsil 522 FF | 2.79 | 0.4 | 78 | 47 | 102 | 21 | 111 | 22 | 90 |
| Tonsil ® Supreme 526 FF | 2.79 | 0.4 | 96 | 58 | 132 | 27 | 80 | 16 | 100 |
| Tonsil 419 FF | 2.79 | 0.4 | 100 | 60 | 69 | 14 | 68 | 14 | 88 |
| P-4000 | 1.7 | 0.8 | 68 | 41 | 85 | 17 | 77 | 16 | 73 |
| B-80-CG | 1.7 | 0.8 | 61 | 36 | 141 | 28 | 75 | 15 | 80 |
| B-80 | 1.7 | 0.8 | 71 | 42 | 75 | 15 | 80 | 16 | 73 |
| Tonsil 522 FF | 1.7 | 0.8 | 65 | 39 | 102 | 21 | 111 | 22 | 81 |
| Tonsil ® Supreme 526 FF | 1.7 | 0.8 | 90 | 54 | 132 | 27 | 80 | 16 | 96 |
| Tonsil 419 FF | 1.7 | 0.8 | 100 | 60 | 69 | 14 | 68 | 14 | 88 |

In an overall evaluation of the efficiencies Tonsil® Supreme 526 FF, the bleaching earth according to the invention, has a lower bleaching efficiency but a higher filtration efficiency and oil retention efficiency when compared to Tonsil 419 FF. In total efficiency Tonsil® Supreme 526 FF therefore has a better performance than Tonsil 419 FF.

Example 4

Purification of Biodiesel

Manufacturing of Biodiesel from Soybean/Palm Oil:

Transesterification is by far the most common method to produce Biodiesel out of refined, bleached and deodorized (RBD) soybean or palm oil. During the transesterification reaction, the vegetable oil is reacted in the presence of a catalyst (usually a base) with an alcohol (usually methanol) to obtain the corresponding methyl esters of the fatty acids mixture found in the correspondent oil and glycerol.

The purification of Biodiesel was performed by using a known adsorbent (Magnesol®, The Dallas Group of America, Inc. USA) and of an adsorbent according to the invention (Biosil™, Süd-Chemie de Mexico, S.A. de C.V., Puebla, MX). The properties of Biosil™ are summarized in table 12

TABLE 12

| physical properties of Biosil ™ | |
|---|---|
| specific surface (BET) (m²g) | 218 |
| pore volume (ml/g) | 0.530 |
| Pore volume distribution (%) | |
| 0-75 Å | 16.7 |
| 75-140 Å | 17.4 |
| 140-250 Å | 24.0 |
| 250-800 Å | 32.1 |
| >800 Å | 9.8 |
| cation exchange capacity (meq/100 g) | 45 |
| sediment volume in water (ml/2 g) | <8 |
| silicate analysis (wt.-%) | |
| $SiO_2$ | 73.5 |
| $Fe_2O_3$ | 3.1 |
| $Al_2O_3$ | 9.0 |
| CaO | 1.9 |
| MgO | 2.4 |

TABLE 12-continued

| physical properties of Biosil ™ | |
| --- | --- |
| Na$_2$O | 1.0 |
| K$_2$O | 1.1 |
| TiO$_2$ | 0.30 |
| ignition loss (2 h, 1000° C. | 7.25 |
| Total | 99.55 |

Purification Tests:

20% methanol and 0.25% NaOH (oil weight basis) is added to the RBD soybean or palm oil. The mixture was agitated for 60 min at 400 rpm at 50° C. in a water bath and then allowed to sedimentation during 8 hours before separation from glycerol by decantation. The resulting Biodiesel (without further washing with water) was neutralized with concentrated sulphuric acid (96%) and treated with 1% (biodiesel weight basis) clay adsorbent (Biosil™, Süd-Chemie de Mexico, S.A. de C.V., Puebla, MX) or with Magnesol® (synthetic magnesium silicate from the Dallas Group of America, Inc., USA) at ambient conditions during 20 min. at 250 rpm and finally filtered through an appropriate filter paper to separate the adsorbent from the purified Biodiesel. The obtained Biodiesel was analyzed for its Karl-Fischer moisture (%) according to AOCS Ca 2e-84(97) method, acid value mg KOH/g according to AOCS Cd 3a-63 method, oxidative stability index (OSI) according to the AOCS Cd 12b-92 method and the heavy metals content (ICP), described before.

The results of a purifications made with Biosil™ and with Magnesol® are summarized in table 13 (soybean biodiesel) and 14 (palm oil biodiesel).

TABLE 13

Purification of biodiesel obtained from soybean oil

| | | Lovibond | | A.O.C.S. methods | | | | | | | | |
| --- | --- | --- | --- | --- | --- | --- | --- | --- | --- | --- | --- | --- |
| | | PFX950 Lovibond scale Color: | | Ca 2e-84(97) Karl-Fischer | Cd 3a-63 acid | Cd 12b-92 Stability, hrs | | Heavy metals ICP | | | | |
| | Dose | 5¼" | | moisture | value mg | OSI | AOM | Cu | P | Ca | Fe | Mg |
| | (%) | R | A | (%) | KOH/g | 110° C. | 97.8° C. | ppm | ppm | ppm | ppm | ppm |
| RBD soybean oil | — | 0.5 | 3.6 | 0.14 | 0.05 | 20.5 | 49.18 | <0.05 | <0.4 | <0.06 | <0.06 | <0.1 |
| Soybean biodiesel before neutralization an purification | — | 1.9 | 14.0 | 0.13 | 0.15 | — | — | <0.05 | <0.4 | <0.06 | <0.06 | 0.35 |
| Treatment with Biosil without neutralization (pH = 11.2) | 1.0 | 2.1 | 15.0 | 0.11 | 0.20 | 3.55 | 8.12 | <0.05 | <0.4 | 23.33 | <0.06 | 10.16 |
| Biodiesel at pH = 11.0 + H$_2$SO$_4$ (until pH = 6.55) + Magnesol ® | 1.0 | 1.6 | 13.0 | 0.13 | 0.51 | 4.55 | 10.54 | <0.05 | <0.4 | <0.06 | <0.06 | 0.48 |
| Biodiesel at pH = 11.0 + H$_2$SO$_4$ (until pH = 6.55) + Biosil | 1.0 | 1.6 | 13.0 | 0.13 | 0.48 | 4.90 | 11.39 | <0.05 | <0.4 | <0.06 | <0.06 | 0.27 |

TABLE 14

Purification of biodiesel obtained from palm oil

| | | Lovibond | | A.O.C.S. methods | | | | | | | | |
| --- | --- | --- | --- | --- | --- | --- | --- | --- | --- | --- | --- | --- |
| | | PFX950 Lovibond scale Color: | | Ca 2e-84(97) Karl-Fischer | Cd 3a-63 acid | Cd 12b-92 Stability, hrs | | Heavy metals ICP | | | | |
| | Dose | 5¼" | | moisture | value mg | OSI | AOM | Cu | P | Ca | Fe | Mg |
| | (%) | R | A | (%) | KOH/g | 110° C. | 97.8° C. | ppm | ppm | ppm | ppm | ppm |
| RBD palm oil | — | 2.8 | 51 | 0.03 | 0.06 | 22.0 | 52.82 | <0.05 | <0.4 | <0.06 | <0.06 | <0.1 |
| Palm biodiesel before neutralization an purification | — | 2.9 | 50.0 | 0.13 | 0.10 | — | — | <0.05 | 1.3 | <0.06 | <0.06 | 0.28 |
| Treatment with Biosil without neutralization (pH = 11.0) | 1.0 | 2.0 | 31.0 | 0.10 | 0.20 | 7.80 | 18.42 | <0.05 | 1.27 | 1.3 | <0.06 | 6.38 |

TABLE 14-continued

Purification of biodiesel obtained from palm oil

| | | Lovibond | | A.O.C.S. methods | | | | | | | |
|---|---|---|---|---|---|---|---|---|---|---|---|
| | | PFX950 Lovibond scale Color: 5¼" | | Ca 2e-84(97) Karl-Fischer moisture | Cd 3a-63 acid value mg | Cd 12b-92 Stability, hrs | | Heavy metals ICP | | | | |
| | Dose (%) | R | A | (%) | KOH/g | OSI 110° C. | AOM 97.8° C. | Cu ppm | P ppm | Ca ppm | Fe ppm | Mg ppm |
| Biodiesel at pH = 11.0 + H₂SO₄ (until pH = 7.73) + Magnesol ® | 1.0 | 1.9 | 28.0 | 0.09 | 0.50 | 11.95 | 28.47 | <0.05 | 0.56 | <0.06 | <0.06 | 0.67 |
| Biodiesel at pH = 11.0 + H₂SO₄ (until pH = 7.73) + Biosil | 1.0 | 1.9 | 28.0 | 0.10 | 0.51 | 14.00 | 33.44 | <0.05 | 0.47 | <0.06 | <0.06 | 0.36 |

The invention claimed is:

1. Method for bleaching fats and/or oils, wherein
a crude oil derived from animal or plant material is provided;
the crude oil is treated with a bleaching material comprising a clay material having:
a surface area of 180 to 300 m$^2$/g;
a total pore volume of 0.5 to 0.7 ml/g;
wherein at least 60% of the total pore volume are provided by pores having a pore diameter of at least 140 Å, at least 40% of the total pore volume is provided by pores having a pore diameter of less than 250 Å and at least 15% of the total pore volume are provided by pores having a pore diameter of 140 to 250 Å and less than 20% of the total pore volume is formed by pores having a diameter of >800 Å;
a SiO$_2$ content of between more than 60 wt. % and less than 75 wt. %;
an aluminum content, calculated as Al$_2$O$_3$, of between less than 12 wt. % and more than 2 wt. %; and
said clay material having an amorphous structure according to XRD data; and
the bleached oil is separated from the used bleaching material.

2. Method according to claim 1, wherein the clay material is an acid activated clay material.

3. Method according to claim 2, wherein the acid is selected from the group of phosphoric acid, sulphuric acid and citric acid.

4. Method according to claim 2, wherein the clay material is acid-activated by depositing an acid on the clay and the amount of acid deposited on the clay material is selected within a range of 2 to 5 wt.-%, calculated as water-free acid and based on the weight of the dry clay material.

5. Method according to claim 1, wherein the crude oil is selected from the group of canola oil, soybean oil, rapeseed oil, palm oil, sunflower oil.

6. Method according to claim 1, wherein the crude oil contains phosphorous in an amount of less than 100 ppm.

7. Method according to claim 1, wherein the crude oil is transesterified with methanol before treatment with the clay material.

8. Method for producing an adsorbent, in particular a bleaching earth, wherein a clay material having:
a surface area of 180 to 300 m$^2$/g;
a total pore volume of 0.5 to 0.7 ml/g;
wherein at least 60% of the total pore volume are provided by pores having a pore diameter of at least 140 Å, at least 40% of the total pore volume is provided by pores having a pore diameter of less than 250 Å and at least 15% of the total pore volume are provided by pores having a pore diameter of 140 to 250 Å and less than 20% of the total pore volume is formed by pores having a diameter of >800 Å;
a SiO$_2$ content of between more than 60 wt. % and less than 75 wt. %;
an aluminum content, calculated as Al$_2$O$_3$, of between less than 12 wt. % and more than 2 wt. %; and
said clay material having an amorphous structure according to XRD data;
is activated by an activation procedure, wherein the clay is activated by contacting the clay material with an acid.

9. Method according to claim 8, wherein at least 20% of the total pore volume of the clay material is provided by pores having a pore diameter of less than 140 Å.

10. Method according to claim 8, wherein at least 10% of the total pore volume of the clay material is provided by pores having a pore diameter of 75 to 140 Å.

11. Method according to claim 8, wherein less than 40% of the total pore volume of the clay material is formed by pores having a pore diameter of 250 to 800 Å.

12. Method according to claim 8, wherein at least 12% of the total pore volume of the clay material is provided by pores having a pore diameter of less than 75 Å.

13. Method according to claim 8, wherein less than 80% of the total pore volume of the clay material is formed by pores having a pore diameter of more than 140 Å.

14. Method according to claim 8, wherein less than 60% of the total pore volume is formed by pores having a pore diameter of at least 250 Å.

15. Method according to claim 8, wherein the clay material contains aluminum, calculated as Al$_2$O$_3$, in an amount of less than 10 wt.-%.

16. Method according to claim 8, wherein the acid is deposited on the clay in an amount of 2 to 5 wt.-%, calculated as water-free acid and based on the weight of the dry clay material.

17. Method according to claim 8, wherein the clay material is leached with the acid.

18. Method according to claim 17, wherein the amount of acid is selected within a range of 15 to 40 wt.-%, calculated as water-free acid and based on the weight of the dry clay material.

19. Method according to claim 8, wherein the clay material is separated from the acid after extraction, washed, dried and optionally ground.

20. Method according to claim 8, wherein the acid is selected from the group of phosphoric acid, sulphuric acid and citric acid.

* * * * *

UNITED STATES PATENT AND TRADEMARK OFFICE
CERTIFICATE OF CORRECTION

PATENT NO.        : 8,394,975 B2                                                    Page 1 of 1
APPLICATION NO. : 12/513918
DATED             : March 12, 2013
INVENTOR(S)       : Ortiz Niembro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this
First Day of September, 2015

Michelle K. Lee
*Director of the United States Patent and Trademark Office*